United States Patent [19]

Takahashi

[11] Patent Number: 5,122,584
[45] Date of Patent: Jun. 16, 1992

[54] PROCESS FOR PREPARING ETHYLENE COPOLYMERS

[75] Inventor: Tadashi Takahashi, Yokkaichi, Japan

[73] Assignee: Mitsubishi Petrochemical Company Limited, Tokyo, Japan

[21] Appl. No.: 803,792

[22] Filed: Dec. 6, 1991

Related U.S. Application Data

[63] Continuation of Ser. No. 466,234, Jan. 17, 1990, abandoned.

[30] Foreign Application Priority Data

Jan. 21, 1989 [JP] Japan .................... 1-12747
Apr. 6, 1989 [JP] Japan .................... 1-87676

[51] Int. Cl.⁵ .................... C08F 4/654; C08F 210/02
[52] U.S. Cl. .................... 526/125; 502/126;
526/129; 526/165; 526/348.5; 526/348.6
[58] Field of Search .................... 526/125

[56] References Cited

U.S. PATENT DOCUMENTS

| | | | |
|---|---|---|---|
| 3,242,099 | 3/1966 | Manyik et al. | 526/153 |
| 4,354,009 | 10/1982 | Goeke et al. | 526/901 |
| 4,521,573 | 6/1985 | Lee et al. | 526/901 |

FOREIGN PATENT DOCUMENTS

| | | | |
|---|---|---|---|
| 64-6003 | 1/1989 | Japan | 526/160 |
| 64-6005 | 1/1989 | Japan | 526/160 |

*Primary Examiner*—Edward J. Smith
*Attorney, Agent, or Firm*—Koda and Androlia

[57] ABSTRACT

A process for producing an ethylene copolymer, which comprises contacting ethylene and an α-olefin having 3-20 carbon atoms such as hexene with a catalyst comprising the following components (A) and (B):

Component (A)
a solid catalyst component for a Ziegler type catalyst which is obtained by contacting a magnesium halide such as $MgCl_2$, a titanium halide such as $TiCl_3$ and tetrahydrofuran and has a molar ratio of tetrahydrofuran/titanium in the range of 3-20; and Component (B)
an alumoxane having a structure of

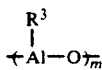

with an average polymerization degree m in the range of 3-50 and having a hydrocarbyl group $R^3$ of 1-10 carbon atoms such as hexaisobutyltetraalumoxane where $R^3$ is isobutyl and m is 4.

12 Claims, No Drawings

PROCESS FOR PREPARING ETHYLENE COPOLYMERS

This is a continuation of application Ser. No. 466,234, filed Jan. 17, 1990, now abandoned.

BACKGROUND OF THE INVENTION

1. Field of the Art

The present invention relates to a process for preparing ethylene copolymers by copolymerizing ethylene and an α-olefin having 3–20 carbon atoms in the presence of a specific catalyst.

2. Related Art

Catalysts comprising a magnesium halide, a titanium halide and an electron donor have high polymerization activities of an α-olefin, and thus a number of such catalysts have hitherto been developed, in which a variety of processes such as a slurry method, a vapor (or alternatively gas) phase method, a solution method or a high pressure bulk method is used. Among these catalysts, certain catalysts are used under the polymerization condition at a polymerization temperature of 140° C. or more. Particularly, it is known in the art that ethylene copolymers excellent in transparency, strength, surface tackiness, heat-sealing property and hot tack of film of the copolymers can be prepared by using such a catalyst in the copolymerization of ethylene and an α-olefin having 5 or more carbon atoms (Japanese Patent Publication No. 52643/1984, and Japanese Patent Laid-Open Publication Nos. 75910/1984 and 88016/1985).

Unfortunately, it is generally impossible, however, to prepare a copolymer with such excellent properties of ethylene and an α-olefin having 5 or more carbon atoms at a relatively low temperature such as 95° C. or less with the aforementioned catalysts. This is probably because the use of an organoaluminum halide as an activating agent a co-catalyst of a Ziegler catalyst at a high polymerization temperature is critical for the expression of such a specific catalyst property and thus the production of preferable ethylene copolymers. Therefore, it will be of quite a value from the aspect of the saving of resources and energy that such specific ethylene copolymers can be prepared by a slurry method or a vapor phase method in which polymerization proceeds with forming a polymer in the shape of particles at a relatively low temperature.

Moreover, it is also well known from Japanese Patent Laid-Open Publication Nos. 148093/1979, 154488/1979, 62292/1979, 52309/1980 and 56110/1980 or Japanese Patent Publication Nos. 20843/1988, 20844/1988 or the like that a catalyst system comprising a magnesium halide, a titanium halide and a trialkylaluminium has a high activity in the copolymerization of ethylene with propylene or butene at a low temperature and is excellent in copolymerizability (comonomer incorporation), so that it can be preferably applied to a polymerization method in vapor phase or in slurry in which polymerization generally proceeds with forming a copolymer in the shape of particles at a polymerization temperature of 100° C. or less. There was, however, a problem that a copolymer having a density of 0.920 g/cm$^3$ or less was prepared and fabricated into film particularly in the copolymerization of ethylene with butene with use of such a catalyst system, the copolymer usually exhibited a severe surface tackiness. Thus, additives of inorganic compounds such as silica, zeolite, calcium carbonate or the like have been usually incorporated for the purpose of reducing the tackiness. The additive must be used in a large amount for reducing the surface tackiness to a desired level, and thus serious problem remains in the production cost in such a method.

According to the researches of the present inventors, it has been found that the excellent features of the aforementioned ethylene copolymers are derived from the characteristics of the primary structure of the copolymers, and that these characteristics typically appears in the melting point of the copolymers. In other words, a preferred copolymer prepared in the high temperature range of 95° C. or more as described above has several melting points (endothermic peaks), one of which melting points (endothermic peak) appears at a relatively low temperature range (ca. 90–115° C.), while a copolymer prepared in a low temperature range of 95° C. or less has substantially one melting point (endothermic point) at a relatively high temperature range (ca. 120–126° C). It is believed from these facts that a homogeneous copolymer having a relatively high density and another homogeneous copolymer having a relatively low density are present in the copolymer prepared at a high temperature range as described above and the latter largely contributes to the improvement of the transparency, strength, heat-sealing property and hot tack.

It has been reported that the aforementioned qualities of copolymers such as the transparency, strength, surface tackiness or heat-sealing property of film of the copolymer relate to the composition distribution of the copolymer and that the qualities are more excellent as the distribution becomes narrower [Y. Sakota, *Speciality Plastics Conference* 1988, Nov. 28–30, Zuerich, "VLDPE for extrusion coating"- polyethylene and polypropylene resins, markets and applications - Maack Business Services (Switzerland)]. The composition distribution of the copolymer can be determined by the TREF method, which is a conventional technique for the analysis of the composition distribution of a copolymer: Macromolecules, 19, 2722–2726 (1986). It is also possible to determine the composition distribution by analyzing a copolymer according to the DSC method.

Such a copolymer as described above has a plurality of melting point peaks in the determination of the melting points according to the D C method, one of which melting points appears at a relatively low temperature (90–115° C.) and others appear at relatively high temperature (115–126° C.). It has been reported by S. Hosoda in Polymer Journal, 20 (5), 383–397 (1988) that the ratio of the low temperature peak/high temperature peaks conveniently expresses the composition distribution, and that the composition distribution is narrower as the area ratio is larger. The composition distribution can also be expressed by the peak height ratios (if a plurality of peaks are present at the higher temperature side, the highest peak is used for the calculation of the ratio).

SUMMARY OF THE INVENTION

The present invention is to provide a process for preparing an ethylene copolymer which has the aforementioned melting point properties and is excellent in transparency, strength, heat-sealing property, hot tack or the other physical properties of film of the copolymer at a low polymerization temperature with use of a specific and novel catalyst.

The present invention accordingly provides a process for producing an ethylene copolymer, which comprises contacting ethylene and an α-olefin having 3-20 carbon atoms with a catalyst comprising the following components (A) and (B):

Component (A)

a solid catalyst component for a Ziegler type catalyst which is obtained by contacting a magnesium halide, a titanium halide and tetrahydrofuran and has a molar ratio of tetrahydrofuran/titanium in the range of 3-20; and Component (B)

an alumoxane having a structure of

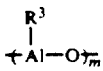

with an average polymerization degree m in the range of 3 to 50 and having a hydrocarbyl group $R^3$ of 1-10 carbon atoms.

According to the present invention, an ethylene copolymer having a good comonomer distribution and an excellent homogeneity of a copolymer composition on the TREF analysis can be prepared at a low polymerization temperature of 20-95° C. [TREF analysis: Temperature Rising Elution Fractionation analysis; see Macromolecules, 19, 2722-2726 (1986)]. Thus, it is possible to reduce thermal energy or omit heating means for conducting polymerization at a high temperature which have conventionally been thought to be needed.

It can also be expected to obtain film having an excellent transparency, strength, heat-sealing property or hot tack by the use of the copolymer obtained by the present invention.

In this connection, reference is found in Japanese Patent Laid-Open Publication No. 120992/1976 wherein a wide variety of catalysts are disclosed, to a composite comprising a magnesium halide, a titanium halide and an ether as a solid catalyst component and to a tetraethylalumoxane as an organoaluminum compound component. However, the actually disclosed is homopolymerization of ethylene or of propylene and no examples of copolymerization of ethlyene with an α-olefin nor experimentation of the use of the aforementioned combination of the catalysts is found.

DESCRIPTION OF THE PREFERRED EMBODIMENT OF THE INVENTION
CATALYST

The catalyst used in the process of ethylene copolymerization according to the present invention comprises the specific components (A) and (B). Herein, the term "comprises" means that the components is not limited to those particularly mentioned and does not exclude any compatible or reasonable third component.

Component (A)

The component (A) is a solid catalyst component for a Ziegler type catalyst which is obtained by contacting a magnesium halide, a titanium halide and tetrahydrofuran (THF) and has a molar ratio of tetrahydrofuran/titanium in the range of 3-20, preferably of 5-15. Herein, the phraseology "obtained by contacting" means that, in addition to the aforementioned particular three components, any other compatible or reasonable components can further or additionally be contacted simultaneously or stepwise or in plural portions.

As the magnesium halide ($MgX_2$), magnesium chloride and magnesium bromide are preferable, and magnesium chloride is particularly preferable.

As the titanium halide, there can be used a titanium compound represented by the general formula $Ti(OR)_qX_{p-q}$, wherein OR represents an alkoxy group having 1-8 carbon atoms, X represents a halogen atom, q is a number satisfying an equation: $0 \leq q \leq 2$, and p denotes 4 or 3. As the preferred titanium compound, there are mentioned, for example, $TiCl_3$, $TiBr_3$, $Ti(OC_2H_5)Cl_2$, $Ti(OC_4H_9)Cl_2$, $TiCl_4$, $Ti(OC_2H_5)Cl_3$, $Ti(OC_4H_9)Cl_3$ and the like, more preferably $TiCl_3$ and $TiCl_4$, particularly $TiCl_3$.

The titanium compound can be a trivalent titanium compound which has been formed by the reduction of tetravelent titanium compound during the formation of a solid catalyst component.

Tetrahydrofuran(THF)- may be used alone or may be used as a mixture with another ether such as a mono- or di-ether having the total carbon atoms of 2-10, for example, pyran, dioxane, diethyl ether, dipropyl ether, dibutyl ether or the like in an amount of up to the same volume as that of THF.

The magnesium halide, the titanium halide and THF can be contacted in a variety of well-known suitable methods. Some typicals of the preferred contact methods are shown below:

(i) A method of dissolving a magnesium halide and a titanium halide in THF as a solvent to contact them, adding a poor solvent to deposit a composite of the three, which is washed with an inert hydrocarbon solvent to remove the excessive THF;

(ii) A method of adding a porous inorganic oxide to the aforementioned solution of a contact product of a magnesium halide and a titanium halide and removing by distillation of THF to deposit the composite of the magnesium halide, the titanium halide and THF;

(iii) A method of contacting a magnesium halide, a titanium halide and THF in an inert hydrocarbon solvent and washing the contact product with said solvent to remove the excessive THF; and (iv) A method of grinding and mixing a magnesium halide, a titanium halide and THF in a grinder.

Among these methods, the method (ii) or (iii) is preferred.

The preferred component ratio (molar ratio) in the solid catalyst component is Mg:Ti:THF =(1-10):1:(3-20), particularly (1-6):1:(5-15). If the ratio of THF/titanrum is less than the above-described range, the effect of the present catalyst system, that is, the effect of improving the composition distribution or quality of the copolymer, may not be enjoyed. If the ratio is excessively large, the activity may be reduced greatly.

The three components are generally contacted with each other at a temperature of 0-100° C. over a period of time from 10 minutes to 50 hours.

The solid catalyst component thus formed can be preliminarily treated with an organoaluminum compound represented by the general formula $R^1_aAl(OR^2)_bX_c$, wherein $R^1$ and $R^2$ represent independently a group selected from a hydrocarbyl group having 1-10 carbon atoms and a lower alkyl-substituted silyl group; X represents a halogen atom; a, b and c are numbers each satisfying equations: $0 \leq a \leq 2$, $0 \leq b 23 2$, $0 \leq c \leq 2$, and $a + b + c = 3$. As the organoaluminum compound, there can be specifically exemplified dimethylaluminium chloride, diethylaluminium chloride, diisobutylaluminium chloride, methylaluminium dichloride, ethylaluminium dichloride, dimethyl(methoxy)aluminium, diethyl(ethoxy)aluminium, diisobutyl(butoxy)aluminium, ethyl(ethoxy)aluminium chloride, dimethylaluminium trimethylsilyloxide, diethylaluminium trimethylsilyloxide and the like. These organoaluminum compounds can be used alone or as a mixture of the two or more.

These organoaluminum compounds can be also treated with an alumoxane such as one used as the component (B) as shown hereinbelow. It is also possible to perform the so-called preliminary polymerization process in which polymerization of one or more $C_2-C_8$ α-olefins for forming a crystalline polyolefin takes place over the component (A) optionally in the presence of an organoaluminum compound.

Component (B)

An alumoxane used as the component (B) is a compound which has a linear or cyclic structure represented by the general formula or a mixture thereof:

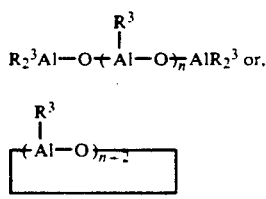

wherein $R^3$ represents a hydrocarbyl group having 1-10 carbon atoms, preferably 2-6 carbon atoms.

It may be possible to express the aforementioned alumoxanes as those having a structure of:

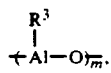

wherein m denotes an average polymerization degree equivalent to "n+2" in the above formulae, and alumoxanes having m in the range of 3 to 50, preferably in the range of 3 to 25, more preferably in the range of 4 to 22, are then preferable to the present invention.

These alumoxanes can be prepared by a variety of well-known methods. For example, when a salt having a water of crystallization such as cupric sulfate pentahydrate is added to an organic solvent such as benzene, toluene, xylene, hexane, heptane or the like and a trialkylaluminium having $C_1-C_{10}$ alkyl groups is then added to the mixture to conduct reaction at a temperature condition of −40 to +60° C., an alumoxane as the aimed compound is obtained.

As the trialkylaluminium used in the production of the alumoxanes, there are mentioned, for exampe, trimethylaluminium, triethylaluminium, tripropylaluminium, triisobutylaluminium , trihexylaluminium, tridecylaluminium or the like. Among them, triisobutylaluminium is particularly preferably used.

The alumoxane used as the component (B) can contain a trialkylaluminium having $C_1-C_{10}$ alkyl groups in an amount up to 30%, preferably 25%, based on aluminium atom, unless it does not impair the effect of the present invention. As the examples of specific trialkylaluminiums, there can be mentioned trimethylaluminium, triethylaluminium, tripropylaluminium, triisobutylaluminium, trihexylaluminium or the like.

Among these trialkylaluminiums, triisobutylaluminium is preferred.

The "alumoxane" may alternatively be called "aluminoxane".

Formation of Catalyst

The catalyst according to the present invention comprises the components (A) and (B), and such a catalyst can be formed by contacting the both components and, if necessary, a third component, simultaneously, stepwise or in plural portions in a polymerization vessel or in the presence of an olefin to be polymerized, or out of a polymerization vessel or in the presence of an olefin to be polymerized.

The ratio of the components (A) and (B) to be used is (B)/(A) =30–1,000, preferably 100–600, based on the ratio of the Al atom to the Ti atom. The method for supplying the components (A) and (B) to a place where they are to contact is not limited. In general, the components are respectively dispersed in a liquid aliphatic hydrocarbon such as hexane, heptane or the like and are separately introduced into a polymerization vessel, or the components are preliminarily contacted and then supplied to the polymerization vessel. The component (A) can be added in a solid state to the polymerization vessel separately from the component (B).

ETHYLENE COPOLYMER AND ITS PRODUCTION

The ethylene copolymer of the present invention is produced by the polymerization in the presence of the aforementioned specific catalyst.

The polymerization of ethylene with an α-olefin having 3-20 carbon atoms can be conducted by either of a slurry method or a vapor phase method. It is also possible to conduct polymerization in either continuous or batch method. Preferred polymerization pressure and ethylene partial pressure are in the range from atmospheric pressure to 50 kg/cm². The polymerization temperature is in the range of 20-95° C., preferably 60-95° C., and the polymerization period is in the range of 30 minutes -6 hours.

As the α-olefin having 3-20 carbon atoms, preferably 3-8 carbon atoms, which is used for the present invention, there can be shown, for example, propylene, butene, pentene, hexene, octene, hexadecene, eicosene or a mixture thereof. When hexene is used, the effect of the present invention can be enjoyed greatly, and thus it is particularly preferable to use hexene. The α-olefin is preferably incorporated into the copolymer by the copolymerization in an amount of 0.5-15 mole %, particularly 3-10 mole %.

The density of the ethylene copolymer during the polymerization can be controlled by a well-known method, for example by changing the supplying ratio of the α-olefin and the ethylene. The molecular weight of the ethylene copolymer can be controlled by a well-known method, for example by addition of hydrogen gas or regulating the polymerization temperature.

The ethylene copolymer according to the present invention thus prepared has a plurality of melting points, maximum of which is at 126° C. or less and at least one of which is in the temperature range of 110-126° C. and another at least one of which is in the range of 80-115° C.

In this connection, the DSC analysis was conducted by maintaining 5 mg of a sample at 150° C. for 3 minutes and then cooled or heated at a rate of 10° C./min.

EXPERIMENTAL EXAMPLES

Example 1 Synthesis of the solid catalyst component (A)

Forty grams of $SiO_2$ (Davison: 952) which had been subjected to dehydration treatment in a $N_2$ stream at 600° C. for 4 hours was added to a solution prepared by preliminarily dissolving 3.9 g of $MgCl_2$ and 2.7 g of $TiCl_3$ (grade A) in 200 cc of tetrahydrofuran at 40° C. The mixture was stirred at 40° C. for 30 minutes, and the temperature was raised up to 70° C. to distil tetrahydrofuran off. After 6 hours, the amount of the residual tetrahydrofuran in the solid catalyst was 15.1% by weight.

The Ti content was 1.2% by weight, and the molar ratio of tetrahydrofuran/Ti was 8.4 (Solid Catalyst I).

Next, 40 g of the aforementioned Solid Catalyst was suspended in 200 cc of heptane, and diethylaluminium chloride in an amount of 7.0 g (the molar ratio per tetrahydrofuran contained =0.7) was added to the suspension at room temperature. The temperature was raised up to 70° C., and heptane was removed under reduced pressure for 2 hours to give a free-flowing solid catalyst (Solid Catalyst II).

Slurry polymerization of ethylene-hexene

To 415 cc of heptane were added 85 cc of hexene, 90 mg (based on the Al atom) of hexaisobutylalumoxane (manufactured by Schering, average polymerization degree m =4) and 70 mg of the aforementioned Solid Catalyst I, and the mixture was charged in an autoclave having a volume of 1.5 liters at 85° C. Hydrogen gas was immediately charged to a pressure of 1 $kg/cm^2$, and the whole content was pressurized to 6 $kg/cm^2$-G with ethylene. Polymerization was conducted with the total pressure maintained for 45 minutes. Acetone was then added, and the polymer produced as recovered by separation from the slurry. The amount of the polymer thus produced was 68 g (solid catalyst yield: 1310 g/g Cat.Hr) having an MI (melt index at the load of 2.16 kg): 1.6 g/10 min.; an FR (a ratio of melt indices at the loads of 10 kg and 2.16 kg, which indicates molecular weight distribution): 8.8; a density: 0.919 $g/cm^3$; hexene content determined by $^{13}C$-NMR: 3.4 mole %; melting points by DSC: 107.0° C. (a), 119.2° C. (b), 121.9° C. (b'), peak height ratio (a)/(b) =0.30; and the eluted amount at 40° C. by TREF: 10.1% by weight (the determination methods are described, for example, in Macromolecules, 19, 2722-2726 (1986). As is described hereinbefore, the lower the value, the narrower. the composition distribution. The residual amount at 92° C. by TREF was 21.3% by weight.

Example 2

The procedures in Example 1 was repeated except that polymerization was conducted for 37 minutes with use of 90 mg of the Solid Catalyst II in place of the Solid Catalyst I in Example 1 to give a polymer of 63.6 g (solid catalyst yield: 1150 g/g Cat.Hr) having an MI: 1.33; FR: 8.2; MFR (the ratio of melt indices at the loads of 21.6 kg and 2.16 kg): 31.8; a density ($g/cm^3$): 0.917; and melting points by DSC: 106.4° C. and 120.0° C. The TREF analysis gave good results of the extraction amount at 40° C. of 11.9% by weight and the residual amount at 92° C. of 21.1% by weight.

Comparative Example 1

The procedures in Example 1 was repeated except that 65 cc of hexene, 100 mg of triethylaluminium and 70 mg of the Solid Catalyst I were added to 435 cc of heptane and polymerization was carried out with a hydrogen pressure of 0.5 $kg/cm^2$ and the total pressure of 5.5 $kg/cm^2$ for 30 minutes. The amount of the polymer thus produced was 84 g (solid catalyst yield: 2400 g/g Cat.Hr) having an MI: 1.9; an FR: 8.0; and a density: 0.918 $g/cm^3$. The melting point by DSC was at one point of 123.0° C. The eluted amount at 40° C. by TREF was 17.0% by weight.

Comparative Example 2

The procedures in Comparative Example 1 was repeated except that the Solid Catalyst II was used in place of the Solid Catalyst I and polymerization was carried out for 45 minutes. The amount of the polymer thus produced was 75 g (solid catalyst yield: 2140 g/g Cat.Hr) having an MI: 0.59; an FR: 7.9; and a density: 0.920 $g/cm^3$. The melting point by DSC was at one point of 123.2° C. The eluted amount at 40° C. by TREF was 14.0% by weight, and the residual amount at 92° C. was 32.0% by weight.

It can be found also from the results of these Examples and Comparative Examples that when the polymer has a plurality of DSC melting points at a lower temperature range and higher temperature ranges, the composition distribution is narrower, that is, the eluted amount at 40° C. is smaller at the same values of an MI and a density, as is described hereinbefore.

Examples 3, 4 and 5

Polymerization was carried out under the conditions specified in Table 1 in the same manner as in Example 1 except that the average polymerization degree m of isobutylalumoxane (manufactured by Toso-Akzo) was changed. The results are also shown in Table 1.

TABLE 1

| Example | Average polymerization degree m | Weight of Al on polymerization (mg) | Solid catalyst (mg) | Polymerization period (min) | Polymer produced (g) | Solid catalyst yield (g/g Cat. Hr) | MI | FR | DSC melting point a (°C.) | DSC melting point b (°C.) | peak height ratio a/b |
|---|---|---|---|---|---|---|---|---|---|---|---|
| 3 | 6 | 130 | 59 | 90 | 73.9 | 840 | 1.3 | 8.2 | 110.4 | 120.7 | 0.23 |
| 4 | 15 | 130 | 69 | 40 | 82.5 | 1800 | 3.3 | 9.0 | 106.0 | 122.0 | 0.37 |
| 5 | 20 | 180 | 70 | 60 | 49 | 700 | 1.1 | 8.5 | 111.4 | 121.6 | 0.31 |

Example 6

Vapor phase polymerization of ethylene-butene

In a 1.5 liter autoclave were charged at 80° C. in sequence 30 g of high-density polyethylene pellets (2 mm ×1 mmφ) as a seed polymer, 75 mg (based on the Al atom) of isobutylalumoxane (manufactured by Toso-Akzo, average polymerization degree m =6) and 91 mg of the Solid Catalyst I used in Example 1. Next, 1.7 $kg/cm^2$ of hydrogen, 13.8 cc of liquefied butene, and an ethylene-butene mixture (gas) containing 4.2 mole % of butene were led into the autoclave up to a total pressure of 8.8 $kg/cm^2$-G. The temperature was raised up to 85°

C., and polymerization was conducted for 70 minutes with the total pressure maintained at the aforementioned level by supplying the gas mixture. The amount of the polymer thus produced was 62.7 g (solid catalyst yield: 590 g/g Cat.Hr) having an MI: 4.2; an FR: 8.4; and melting points by DSC: 109.6° C. (a) and 122.9° C. (b), peak height ratio (a)/(b) =0.31.

Example 7

Vapor phase polymerization of ethylene-butene

In a 1.5 liter autoclave were charged at 55° C. in sequence 30 g of high-density polyethylene pellets (2 mm ×1 mmφ) as a seed polymer, 90 mg (based on the Al atom) of hexaisobutyltetraaluminoxane (manufactured by Schering, average polymerization degree m =4) and 66 mg of the Solid Catalyst II. Next, 1.7 kg/cm$^2$ of hydrogen, liquefied butene in an initial addition amount of 12 cc, and an ethylene-butene mixture (gas) containing 4.2 mole % of butene were pumped into the autoclave up to a total pressure of 8.8 kg/cm$^2$-G. The temperature was raised up to 85° C., and polymerization was conducted for 90 minutes with the total pressure maintained at the aforementioned level by supplying the gas mixture. The amount of the polymer thus produced was 51 g (solid catalyst yield: 520 g/g Cat.Hr) having an MI (melt index at the load of 2.16 kg): 1.2 g/10 min.; an FR (ratio of melt indices at the loads of 10 kg and 2.16 kg): 8.2; and a density 0.920 g/cm$^3$. The TREF analysis indicated the eluted amount at 40° C. or less (corresponding to a copolymer having an extensively high content of a comonomer): 9.8% by weight.

Example 8

Slurry polymerization of ethylene-butene

The procedures in Example 1 were repeated except that 450 cc of heptane, 50 cc of the liquefied butene, 55 mg of the Solid Catalyst I in Example 1, 0.3 kg/cm$^2$ of hydrogen pressure, 5.3 kg/cm$^2$-G of the total pressure and 35 minutes of polymerization period were used to give 54.3 g of a polymer as a product (solid catalyst yield: 1690 g/g Cat.Hr). The polymer had an MI of 1.5, an FR of 8.7 and a density of 0.908 g/cm$^3$. The DSC melting points were 98.2° C. (a), 115.4° C. (b), 119° C. (b') and the peak height ratio =0.47.

Examples 9 and 10

It was determined how polymerization is dependent on the type of the alumoxanes.

(i) Synthesis of alumoxanes

In a 300 cc flask were placed 100 cc of heptane and 11 g of CuSO$_4$·5H$_2$O and stirred, and 111 cc of a heptane solution containing 41.5 g (147 mmoles) of trihexylaluminium was added dropwise at 5° C. over a period of 1 hour. Further reaction at 15° C. for 2 hours and at 25° C. for 48 hours gave hexylalumoxane (Example 9). The above-described procedures for the synthesis of hexylalumoxane were repeated except that tripropylaluminium was used in place of 147 mmoles of trihexylaluminium to give propylalumoxane (Example 10). Slurry polymerization of ethylene-butene:

The procedures in Example 8 were repeated except that the conditions described in Table 2 were used. The results are also shown in Table 2.

TABLE 2

| Example | Alumoxane | Average polymerization degree (m) | Solid catalyst (mg) | Polymerization period (min) | Polymer produced (g) | Solid catalyst yield (g/g Cat. Hr) | MI | FR | DSC melting point a (°C.) | DSC melting point b (°C.) | peak height ratio a/b |
|---|---|---|---|---|---|---|---|---|---|---|---|
| 9 | Hexyl-alumoxane | 12 | 34 | 70 | 60.8 | 1530 | 1.5 | 9.4 | 103.4 | 120.4 | 0.36 |
| 10 | Propyl-alumoxane | 16 | 35 | 95 | 55.8 | 710 | 2.4 | 9.7 | 108.8 | 122.7 | 0.26 |

Comparative Example 3

The procedures in Example 7 were followed except for hexaisobutyltetraaluminoxane replaced with triethylaluminium. The polymerization was conducted in the same manner as in Example 7 except for the use of 100 mg of triethylaluminium, 62 mg of the Solid Catalyst II and the liquefied butene in an initial addition amount of 11 cc to give a polymer in an amount of 51 g (solid catalyst yield: 550 g/g Cat.Hr). The polymer thus produced had an MI of 1.2, an FR of 7.5 and a density of 0.920. The eluted amount at 40° C. by TREF was 13.1% by weight.

Example 11 and Comparative Example 4

Synthesis of the solid catalyst component (A)-(I):

The procedures in Example 1 were repeated except that the conditions described in Table 3 were used, and the Solid Catalyst I in the solid catalyst component (A) having different molar ratios of Mg/Ti and molar ratios of tetrahydrofuran/Ti were synthesized. Slurry polymerization of ethylene-hexene:

The procedures in Example 1 were repeated except that the conditions described in Table 3 were used. The results are also shown in Table 3.

TABLE 3

| Example | Synthesis of catalyst MgCl$_2$ (g) | TiCl$_3$ (A) (g) | Molar ratio of Mg/Ti | SiO$_2$* treated with TEA (g) | Molar ratio of THF/Ti | Polymerization Solid catalyst (I) (mg) | Polymerization period (min) | Polymer produced (g) | Solid Catalyst yield | MI | FR | Polymer DSC melting point a (°C.) | b (°C.) | b' (°C.) | peak height ratio a/b |
|---|---|---|---|---|---|---|---|---|---|---|---|---|---|---|---|
| 11 | 3.9 | 4.0 | 2 | 40 | 7.3 | 71 | 28 | 68.1 | 950 | 5.1 | — | 105.8 | 120.0 | 122.4 | 0.24 |
| Comparative Example 4 | 3.9 | 0.80 | 10 | 35 | 12 | 34 | 120 | 23.5 | 690 | 0.56 | 8.3 | — | 122.1 | — | — |

*SiO$_2$ was treated with AlEt$_3$ (AlEt$_3$/SiO$_2$ = 0.05 (weight ratio)) and dried.

Comparative Example 5

Synthesis of the solid catalyst component (A)-(I):

In a 300 cc flask were charged 100 ml of heptane and 3.3 g of the ground product of MgCl₂ and TiCl₃ (grade A) (co-ground product having a molar ratio of 3:1 with a vibration mil for 48 hours). A 10 cc portion of heptane containing 0.98 g of tetrahydrofuran (molar ratio to Ti = 2) was added dropwise to the mixture under stirring at 25° C. The temperature was raised to 40° C. and the reaction was conducted for 2 hours.

Slurry polymerization of ethylene-hexene

The procedures in Example 1 were repeated except that polymerization was conducted for 60 minutes with the solid catalyst component thus prepared in an amount of 1 mg based on Ti, and 102 g of a polymer was obtained as the product. MI was 23 and the DSC melting point was at one point of 122.5° C.

Example 12

Polymerization was conducted in the same manner as in Example 1 except that hexaisobutylalumoxane was replaced with methylalumoxane (manufactured by Toso-Akzo, average polymerization degree "m"=18) and 47 mg of the solid catalyst, 40 cc of hexene, 200 cc of toluene and the polymerization period of 90 min were used. As a result, 34 g of a polymer was obtained (solid catalyst yield: 490 g/g Cat.Hr) having an MI: 0.2; an FR 9.2; and the DSC melting points 104.5° C. (a), 120.0° C. (b) and peak height ratio (a)/(b) 0.28.

Example 13

Synthesis of the solid catalyst component (A)

The procedures in Example 1 were repeated except that 2.7 g of TiCl₃ (grade A) was replaced with 2.6 g of TiCl₄, and the Solid Catalyst I was obtained. The solid catalyst had the tetrahydrofuran content of 11.9% by weight, the Ti content of 1.2% and the molar ratio of tetrahydrofuran/Ti = 6.5.

Slurry polymerization of ethylene-hexene

Polymerization was conducted in the same manner as in Example 1 except that 84 mg of the solid catalyst obtained above, 90 mg (based on the Al atom) of isobutylalumoxane which had been used in Example 3 and the polymerization period for 90 min were used, and the polymer was obtained in the yield of 75.6 g (solid catalyst yield: 900 g/g Cat.Hr) having an MI: 16; and the DSC melting points: 108.8° C. (a), 122.5° C. (b), 125.2° C. (b') and peak height ratio (a)/(b) 0.23.

Examples 14-17

Synthesis of the solid catalyst component (A)-(II)

The Solid Catalyst II was obtained by replacing the Solid Catalyst I obtained in Example 1 with diethylaluminium chloride and conducting treatments with a variety of organoaluminum compounds under the conditions specified in Table 4. Slurry polymerization of ethylene-hexene:

The procedures in Example 1 was repeated except the conditions specified in Table 4 were used. The results are also shown in Table 4.

TABLE 4

| | Synthesis of catalyst | | Polymerization | | | | Polymer | | DSC melting point | | |
|---|---|---|---|---|---|---|---|---|---|---|---|
| Example | Organoaluminium | Molar ratio of Al/THF | Solid catalyst (mg) | Polymerization period (min) | Polymer produced (g) | Solid Catalyst yield | MI | FR | a (°C.) | b (°C.) | peak height ratio a/b |
| 14 | Dimethylaluminium methoxide | 0.8 | 85 | 45 | 75.8 | 1140 | 5.9 | — | 111.8 | 124.0 | 0.29 |
| 15 | Diethylaluminium ethoxide | 0.8 | 91 | 35 | 68 | 1280 | 8.4 | — | 106.0 | 123.6 | 0.28 |
| 16 | Diethylaluminium trimethylsilyloxide | 0.8 | 116 | 30 | 66.7 | 1150 | 4.4 | — | 111.4 | 124.0 | 0.28 |
| 17 | Ethylethoxyaluminium chloride | 0.8 | 81 | 50 | 60.9 | 900 | 1.6 | 8.5 | 113.0 | 123.0 | 0.29 |

Example 18

Slurry polymerization of ethylene-hexene

Polymerization was conducted in the same manner as in Example 3 except that 120 cc of hexene, 380 cc of heptane, 78 mg of the Solid Catalyst and the polymerization period of 55 min were used, and the polymer was obtained in the yield of 75.5 g (solid catalyst yield: 1060 g/g Cat.Hr) having an MI: 1.9; an FR: 9.0; a density: 0.910 g/cm³; and the DSC melting points: 103.7° C. (a), 119.5° C. (b') and peak height ratio (a)/(b) 0.42.

Example 12

Slurry polymerization of ethylene-hexene

An aluminium compound mixture of isobutylalumoxane used in Example 1 to which 20% (based on the Al atom) of triisobutylaluminium was added was prepared. The procedures in Example 1 were repeated except that isobutylalumoxane was replaced with the aforementioned mixture and polymerization was conducted for 50 minutes, and the polymer as the product was obtained in the yield of 64.7 g (solid catalyst-yield: 1110 g/g Cat.Hr) having an MI: 3.1; and Fr: 9.0; a density 0.923 g/cm³; and the DSC melting points: 109.6° C. (a), 123.0° C. (B), and peak height ratio (a)/(b) 0.28.

Example 20

Synthesis of the solid catalyst component (A)

The procedures in Comparative Example 5 were repeated except that 3.9 g (molar ratio to Ti = 8) of tetrahydrofuran was used.

Slurry polymerization of ethylene-hexane

Polymerization was conducted in the same manner as in Comparative Example 5, and the polymer as the product was obtained in the yield of 85.6 g (solid catalyst yield: 1090 g/g Cat.Hr) having an MI: 7.6; and the DSC melting points: 103.0° C. (a), 120.5 ° C. (b), 123.4° C. (b') and peak height ratio (a)/(b) 0.25.

Example 21

To 200 cc of heptane were added 100 cc of hexene, 90 mg (based on the Al atom) of hexaisobutylaluminoxane was in Example 1 and 160 mg of the Solid Catalyst I, and the mixture was charged in an autoclave having a capacity of 1.5 liter. Next, hydrogen in a pressure pb 0.8 kg/cm² and ethylene up to the total pressure of 9 kg/cm² were fed at 85° C., and polymerization was conducted for 20 minutes. The polymer as the product was obtained in the yield of 26.4 g (solid catalyst yield: 500 g/g Cat.Hr) having an MI: 0.47; and MFR: 39.0; a density: 0.917; and the DSC melting points: 105.2° C. and 121.6° C.

Example 22

The procedures in Example 8 were repeated except 90 mg (based on the weight of Al) of isobutylalumoxane (manufactured by Toso-Akzo, average molecular weight 32 370, average polymerization degree m =4) and 60 mg of the Solid Catalyst II in Example 1 were used and polymerization was conducted for 60 minutes. The polymer as the product was obtained in the yield of 58 g (solid catalyst yield: 970 g/g Cat.Hr) having an MI: 0.43; an FR: 6.9; a density: 0.915-g/cm³: and the eluted amount at 40° C. by TREF =11.1% by weight.

I claim:

1. A process for producing an ethylene copolymer, which comprises contacting ethylene and an δ-olefin having 3-20 carbon atoms with a catalyst comprising the following components (A) and (B):

component (A)

a solid catalyst component for a Ziegler type catalyst which is obtained by contacting a magnesium halide, a titanium halide and tetrahydrofuran and has a molar ratio of magnesium: titanium: tetrahydrofurna in the range of (1-10):1:(3-20); and an alumoxane having a structure of

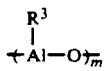

with an average polymerization degree m in the range of 3 to 50 and having hydrocarbyl group $R^3$ of 3-6 carbon atoms, thereby to produce an ethylene copolymer which has a plurality of melting points, maximum of which is at 126° C. or less and at least one of which is in the temperature range of 110 to 126° C. and for another at least one of which is in the range of 80° C. to 115° C.

2. The process as claimed in claim 1, wherein the α-olefin has 3-8 carbon atoms.

3. The process as claimed in claim 1, wherein the α-olefin is hexene.

4. The process as claimed in claim 1, wherein the titanium halide is a compound having a formula:

wherein OR is an alkoxy group of 1 to 8 carbon atoms and X is a halogen atom, and q is a number satisfying an equation: $\leq q <$, and p is 4 or 3.

5. The process as claimed in claim 4, wherein the halogen is chlorine.

6. The process as claimed in claim 1, wherein the magnesium halide is magnesium chloride or bromide.

7. The process as claimed in claim 1, wherein the alumoxane is selected from the group consisting of one having a formula:

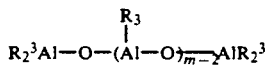

and one having a formula:

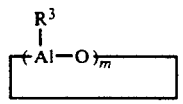

wherein $R^3$ is a hydrocarbyl group of 3-6 carbon atoms and m is a number of 3 to 50.

8. The process as claimed in claim 7, wherein m is 3 to 25.

9. The process as claimed in claim 7, wherein m is 4 to 22.

10. The process as claimed in claim 1, wherein the copolymer comprises 0.5 to 15 mole percent of the α-olefin.

11. The process as claimed in claim 1, wherein the ratio of the component (A) and (B) to be used is such that the ratio (B)/(A) is 30 to 1,000 based on the ratio of the Al atom to the Ti atom.

12. The process as claimed in claim 1, wherein the polymerization pressure is in the range from atmospheric pressure to 50kg/cm², the polymerization temperature is in the range of 20 to 95° C., and the ratio of the components (B)/(A) is 30 to 1,000 based on the ratio of the Al atom to the Ti atom.

* * * * *